United States Patent [19]

Schaumburg

[11] 3,943,008
[45] Mar. 9, 1976

[54] BLOW MOLDED GANG-TYPE VENT FOR A MULTIPLE-CELL ELECTRIC STORAGE BATTERY

[75] Inventor: Ernest Clyde Schaumburg, North St. Paul, Minn.

[73] Assignee: Standard Oil Company, Chicago, Ill.

[22] Filed: Sept. 17, 1973

[21] Appl. No.: 398,213

[52] U.S. Cl. ............................................. 136/177
[51] Int. Cl.² ..................................... H01M 2/12
[58] Field of Search.................... 136/170, 177, 166

[56] References Cited
UNITED STATES PATENTS

| | | |
|---|---|---|
| 2,151,424 | 3/1939 | Galamb.............................. 136/177 |
| 3,265,538 | 8/1966 | Lucas................................. 136/177 |
| 3,424,623 | 1/1969 | Oakley et al....................... 136/166 |
| 3,597,280 | 8/1971 | Hennen............................. 136/177 |

Primary Examiner—Howard S. Williams
Assistant Examiner—H. A. Feeley
Attorney, Agent, or Firm—James R. Henes; Arthur G. Gilkes; William T. McClain

[57] ABSTRACT

A dimensionally flexible one-piece thermoplastic resinous hollow gang-type vent with vent plugs for a plurality of the filling wells of a multiple-cell battery is produced by a blow molding technique.

9 Claims, 6 Drawing Figures

BLOW MOLDED GANG-TYPE VENT FOR A MULTIPLE-CELL ELECTRIC STORAGE BATTERY

BACKGROUND OF THE INVENTION

1. Field of the Invention

This invention relates to a blow molded dimensionally flexible one-piece thermoplastic resinous hollow gangtype vent having plugs for a plurality of the filling wells of a multiplecell battery.

2. Description of the Prior Art

Gases result from charging of an electric storage battery or pressure change. Increasingly electric storage batteries are employed in enclosed areas like boats and motor home trailers, where vent of such battery gases to a point outside the enclosure in which the storage battery is mounted is needed. In addition, for compact design of automobile engines, often very little clearance between the hood and the top of the storage battery is allowed. In such confined areas, vent of battery fluids to a point removed from the hood is desirable to prevent contact of battery fluids with destructible parts. Further, in such enclosed or confined areas, the total height of the battery and its vent and, hence the thickness of the battery vent can be critical for purposes of allowing needed clearance.

There are several prior art vents for multiple-cell batteries. French Pat. No. 1,565,670 teaches an injection molded two-piece device comprising a cover plate and a channel featuring a series of ribbed plugs. The plugs are perforated to allow gas to escape but entrained electrolyte to return to the cell. Lucas, U.S. Pat. No. 3,265,538 (1962) teaches a multiple-vent plug assembly for batteries having covers with upwardly extending projections around the filling wells. This plug assembly is an elongated hollow body composed of two separate sections, a top and a bottom section, which are joined, and perforated plugs which are suspended from holes in the bottom section. Means are provided near the top of the vent for establishing communication between the vent plugs and the bottom section and to provide a seal against egress of electrolyte. Lucas, U.S. Pat. No. 3,284,244 (1965) teaches a multiple vent plug assembly for electrical storage battery filling wells comprising a body provided with a plurality of inwardly extending projections which form pairs of opposing recesses on the underside of the body and a plurality of hollow vent plugs having laterally projecting lugs extending into the recesses, with the plugs being suspended from the body by means of the lugs.

The one-piece gang-type vent of this invention, having vent plugs integral with the rest of the vent solves one of the major problems involved in the prior art, namely escape of gas and electrolyte through points in the vent either where the plugs are attached to the rest of the vent or elsewhere in the vent where two separate pieces are joined to form a unit. The blow molding method permits construction in one-piece rather than multiple pieces as is common in the conventional injection molded style. No assembly work is needed.

SUMMARY OF THE INVENTION

The invention is a dimensionally flexible hollow vent with vent plugs for a plurality of the filling wells of a multiple cell battery. The vent is blow molded in one piece from a thermoplastic material. Gases resulting from charging of the battery or a pressure change can be piped from the battery by means of a tube or tubes formed at one or more locations on the vent. The tube feature permits the gases to be vented at a point removed from the location of the battery and permits several gang-type vents to be connected in series.

This invention is a dimensionally flexible one-piece thermoplastic resinous hollow gang-type vent with vent plugs for a plurality of the filling wells of multiple-cell batteries comprising: a top member, a skirt peripherally and integrally attached at its upper end to said top member and extending downward from said top member, a bottom member peripherally and integrally attached to said skirt at its lower end, and a first tube extending outwardly from the vent. The bottom member comprises vent plugs of a member and location corresponding to the number and location of a plurality of the filling wells of the multiple-cell battery and of suitable dimensions to fit snugly into said filling wells, to form a fluid-tight fit, each vent plug having a hole in its base to permit passage of gases and electrolyte through the vent plug, and a flat region extending from the periphery of said bottom member to the tops of the vent plugs and integrally attached to both.

Preferably, the bottom member includes additionally a ring around the top of each vent plug connecting the flat region to the top of each vent plug and integrally attached to both. More preferably, the bottom member includes additionally a ring around the top of each vent plug connecting the flat region to the top of each vent plug and integrally attached to both and a groove in the flat region between each pair of vent plugs, said groove extending from a point on the skirt to another point on the skirt and separating the segment of the flat horizontal region surrounding one vent plug from the segment of the flat horizontal region surrounding the other vent plug.

Preferably, the top member is a flat surface. More preferably, the top member comprises a shelf portion integrally attached through a downward sloping section to a downwardly offset central portion, forming a central depression located over the vicinity of the vent plugs. Most preferably, the top member comprises a shelf portion integrally attached through a downwardly sloping section to a central portion, said central portion comprising alternating higher and lower regions integrally attached to one another through sloping sections, said lower regions being located over the vent plugs in the region within the walls of the vent plugs.

Preferably, the vent of this invention includes additionally a second vent tube extending outwardly from a different point on the vent than the first vent tube.

The vent of this invention is blow molded in one piece by the method of (a) either extruding either a tubular parison or a pair of film sheets of heated thermoplastic resin and clamping said parison or film sheets while still pliable between mating die members having cooperating mold cavities configured to the external shape of the hollow gang-type vent to be formed, said die members being partable along a parting line of the cavities that proceeds in a single flat plane or in a stepwise fashion around the periphery of the hollow vent to be formed in the area between the top and bottom members of the hollow vent to be formed, or clamping a pair of preheated pliable preformed film sheets of thermoplastic resin between the mating die members; (b) introducing a blow molding duct into said die members and into the parison or between the film sheets to provide communication internally of said plastic parison or film sheets at a point on the surface of the hollow gang-type vent to be formed, and introducing gas under pressure through said duct while said parison or film sheets are clamped between the closed die members in order to force the wall of the parison or of the pair of film sheets outwardly into contact with the surfaces of said mold cavities until the plastic has cooled sufficiently to rigidify; and then (c) parting said die members and removing the molded hollow gang-type vent from the die cavities; said one-piece hollow gang-type vent requiring no assembly work and being joint free, thereby providing added protection against leakage of battery acid or corrosive fumes.

DETAILED DESCRIPTION

Figure 1:
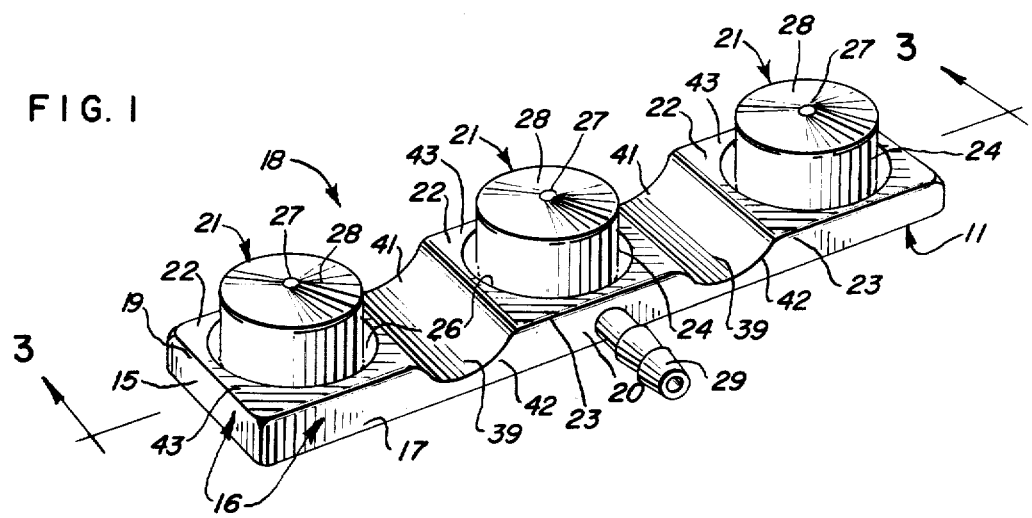
FIG. 1 is a perspective view of the bottom member of a hollow gang-type vent with three vent plugs showing grooves between the vent plugs and a ring around the top of each plug.

There is shown specifically in FIG. 1 the bottom member 18 of an elongated hollow one-piece gang-type vent with vent plugs for three filling wells of a multiple-cell battery. A skirt 16 is peripherally and integrally attached at its upper end 17 to the top member 11 (not shown) and extends downward from the top member 11. The bottom member 18 is peripherally and integrally attached to the skirt 16 at its lower end 19. The bottom member 18 is made up of three vent plugs 21 in series and uniformly spaced, a flat region 22 extending from the periphery 23 of the bottom member 18 to points near the tops 24 of the vent plugs 21, and rings 26 connecting the flat region 22 to the tops 22 of the vent plugs 21, and grooves 39 between adjacent vent plugs 21 and extending across the flat region 22. There is a hole 27 in the base 28 of each vent plug 21. A vent tube 29 extends outwardly from the side 20 skirt 15.

Figure 2:
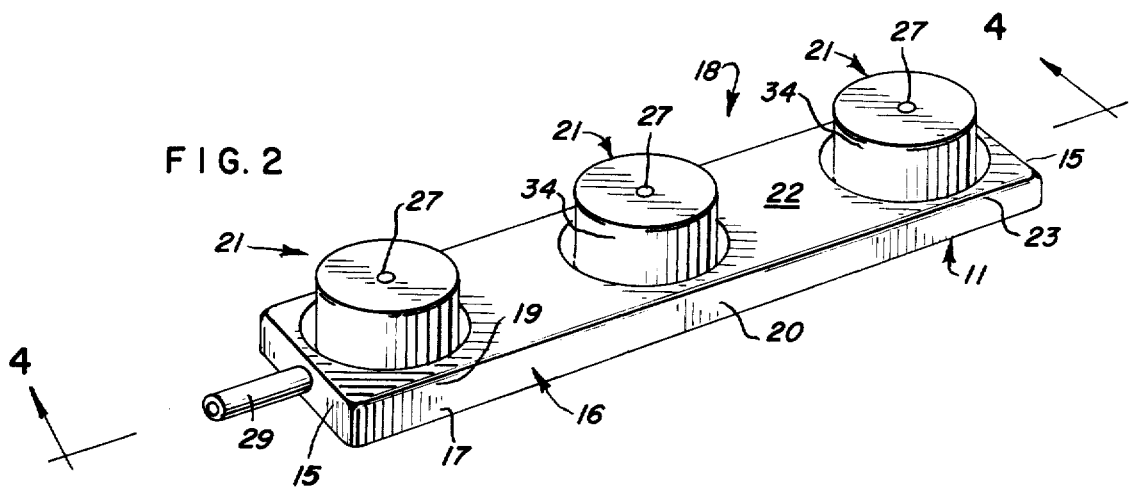
FIG. 2 is a perspective view similar to that of FIG. 1 but showing an alternate mode of the bottom member having no grooves between the vent plugs.

FIG. 2 illustrates another mode of the bottom member 18 of an elongated hollow one-piece gang-type vent with vent plugs for three filling wells of a multiple-cell battery. The bottom member 18 is made up of three vent plugs 21 in series and uniformly spaced, a flat region 22 extending from the periphery 23 of the bottom member 18 to points near the tops 24 of the vent plugs 21 and rings 26 connecting the flat region 22 to the tops 24 of the vent plugs 21. A vent tube 29 extends outwardly from the end 15 of the skirt 16.

Figure 3:
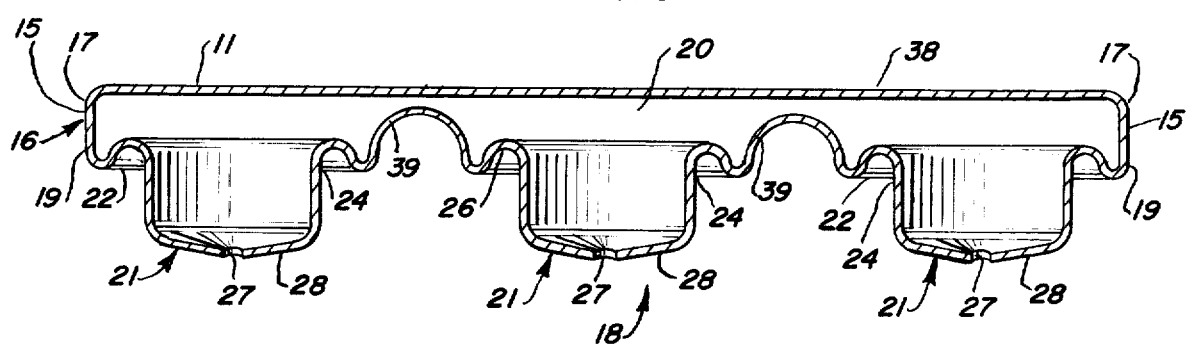
FIG. 3 is a sectional view of FIG. 1 along line 3—3 showing a top member comprising a flat surface.

FIG. 3 shows an elongated hollow one-piece gang-type vent with vent plugs for three filling wells of a multiple-cell battery, having a top member 11 made up of a flat surface 38. The skirt 16 and bottom member 18 are the same as described in FIG. 1.

Figure 4:
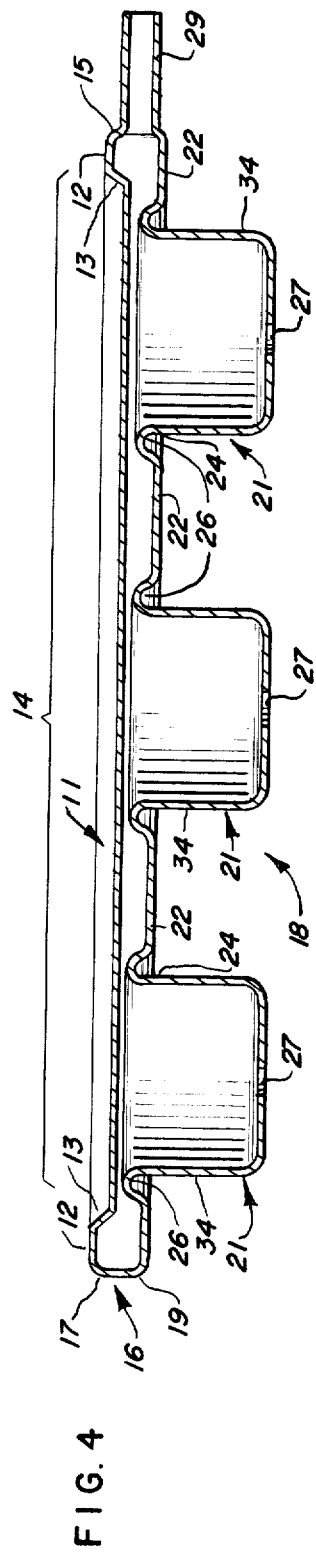
FIG. 4 is a sectional view of FIG. 2 along line 4—4 showing a top member having a shelf portion and a depressed central portion.

FIG. 4 shows an elongated hollow one-piece gang-type vent with vent plugs for three filling wells of multiple-cell battery, having a top member 11 made up of a shelf portion 12 integrally attached through a sloping section 13 to a downwardly offset central portion 14. The skirt 16 and bottom member 18 are the same as described in FIG. 2.

Figure 5:
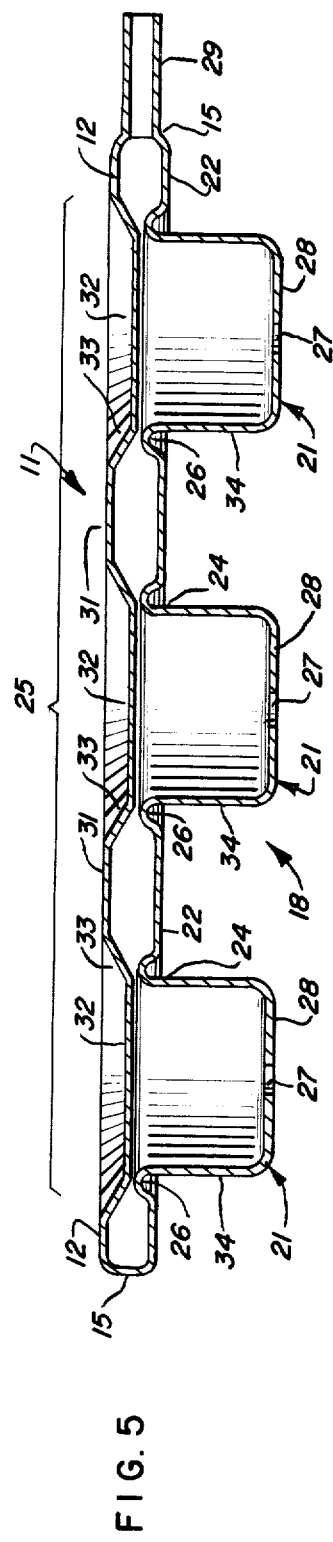
FIG. 5 is a sectional view of FIG. 2 along line 4—4 showing a top member having a shelf portion and a central region made up of alternating higher and lower regions.

FIG. 5 shows an elongated hollow one-piece gang-type vent with vent plugs for three filling wells of a multiple-cell battery having a top member 11 made up of a shelf portion 12 integrally attached through a sloping section 33 to a central region 25. The central region 25 of the top member 11 consists of alternating higher 31 and lower 32 flat regions integrally attached through sloping sections 33. The higher regions 31 are at the level of shelf portion 12, and the lower region 32 are at a level just above the rings 26 of the bottom member 18. The region closest to the shelf portion 12 is a lower region 32 which is integrally attached to the shelf portion 12 through sloping section 33. The lower regions 32 are located directly above the vent plugs 21 of the bottom member 18 and within the walls 34 of the vent plugs 21 while the higher region 31 are located above the flat region 22 of the bottom member 18. The slopping sections 33 are located above the rings 26 of the bottom member 18. The skirt 16 and bottom member 18 are the same as described in FIG. 2.

Figure 6:
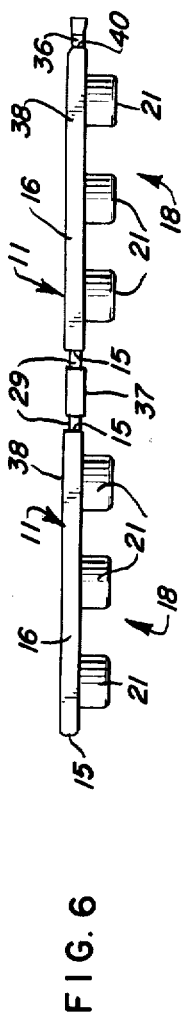
FIG. 6 is a side view showing two vents connected in series.

FIG. 6 shows a pair of elongated hollow gang-type vents connected in series. Each vent has vent plugs for three filling wells of a multiple-cell battery. A vent tube 29 extends outwardly from one end 15 of skirt 16 of each of the hollow gang-type vents. One of the vents has a second vent tube 36 extending outwardly from the second end 40 of its skirt 16. The vent tubes 29 of each vent are connected by means of a connecting tube 37. The top members skirts and bottom members of each vent are as described in FIGS. 2 and 4.

The invention is a blow molded dimensionally flexible one-piece thermoplastic resinous hollow gang-type vent with vent plugs for a plurality of the filling wells of a multiple-cell battery comprising a top member 11, a skirt 16 peripherally and integrally attached at its upper end 17 to the top member 11 and extending downward from the top member 11, a bottom member 18 peripherally and integrally attached to the skirt 16 at its lower end 19. The bottom member 18 comprises vent plugs 21 of a number and location corresponding to the number and location of a plurality of the filling wells of the multiple-cell battery and of a suitable dimensions to fit snugly into the filling wells to form a fluidtight fit between the walls 34 of the vent plug 21 and of the filling well, and a flat region 22 extending from the periphery 23 of the bottom member 18 and integrally connected to the tops 24 of the vent plugs 21. Each vent plug 21 has a hole 27 in its base 28 to permit fluids escaping the cells to enter the hollow vent. A vent tube 29 extends outwardly from the skirt 16 to vent the battery gas at a point removed from the battery.

Because the hollow vent of this invention is of one-piece construction, there is added protection against spillage of battery acid or corrosive fumes which cause severe damage to metal battery mounts, etc. Thus, with the fluid-tight fit between the walls of the vent plugs 21 and of the filling wells, fluid escaping from the filling wells can only enter the hollow vent through the hole 27 in the base 28 of each vent plug 21 and pass into the atmosphere only through the vent tube 29. The hollow one-piece vent can be blow molded from any flexible plastic which is resistant to the battery electrolyte, for example, polypropylene, polyethylene, polystyrene and acrylonitrile butadiene styrene.

Since the separation between the top 11 and bottom 18 members need only be great enough at all points to permit passage of fluids through the vent, the hollow vent can be of a small enough height so as not to add significant height to the battery. This permits the battery to be used in enclosed or confined areas where clearance between the battery and other parts may be a premium. Additionally, the top member 11 in the vicinity of the vent plugs 21 should be close enough to the bottom member 18 to baffle the drops of electrolyte which might splash up from the filling wells through the hole 27 in the base 28 of each vent plug 21. Such baffle is necessary to permit drops splashing from one filling well to drip back down into it and to prevent such drops splashing from one filling well from dripping down into a different well.

The hole 27 in the base 28 of each vent plug 21 must be of sufficient diameter that electrolyte entrained in the hole 27 cannot fill and block the hole 27 by means of capillary action.

preferably, the bottom member 18 comprises additionally a ring 26 around the top 24 of each vent plug 21 connecting the flat region 22 to the tops 24 of the vent plugs 21 and integral with both. Most preferably, the bottom member 18 comprises a ring 26 around the top 24 of each vent plug 21 connecting the flat region 22 to the tops 24 of vent plugs 21 and integral with both and in addition a groove 39 in the flat region 22 between each set of adjacent vent plugs 21. Each groove 39 extends from a point 41 on the skirt 16 to another point 42 on the skirt 16 and separates the segment of the flat region 22 surrounding one vent plug 21 from the segment of the flat region 22 surrounding the other vent plugs 21 resulting in a plurality of flat sections 43 formed from the flat region 22.

It is obvious that a certain amount of contraction of the vent plug 21 must take place as it is wedged into the filling well, and there must be some means of compensating for this, particularly since the wall sections of blow molded articles are not easily controlled, and weak areas can occur. The rings 26 around the tops 24 of the vent plugs 21 provide a generous radius around the vent plug 21 which distributes stresses which might otherwise cause cracking. This permits some dimensional flexibility to compensate for variations in the vents or battery covers. Also since battery covers often have a raised collar around each filling well into which the vent plugs 21 are pushed, the rings 26 also allow the hollow vent to fit down snugly over the battery cover and to allow clearance for the collar so that the height of the collar does not add to the combined height of the battery and hollow vent.

The groove 39 in the flat region 22 between vent plugs 21 is higher than the rings 26 around the individual vent plugs 21 and serves to dam up and collect electrolyte splashed from one filling well and to prevent it from being transferred into a different filling well. In the absence of these grooves 39, the flat region 22 beyond the rings 26 serves as a well to entrain electrolyte which does completely escape from one filling well and to collect it and prevent it from entering another filling well.

The top member 11 suitably comprises a flat surface 38. Alternately, the top member 11 can comprise a shelf portion 12 integrally attached through a downward sloping section 13 to a downwardly offset central portion 14 forming a central depression. The central portion 14 is located over the region of the vent plugs 21 and, if there are rings 26 around the top 24 of vent plugs 21 over such rings 26 or, if no such rings 26 are present, over the segment of the flat region 22 immediately adjacent to the vent plugs 21. Alternately, the top member 11 can comprise a shelf portion 12 integrally attached through a downward sloping section 13 to a central region 25. The central region 25 comprises alternating higher 31 and lower 32 regions integrally attached to one another through sloping sections 33. The lower region 32 are located over the vent plugs 21. The higher regions 31 and downward sloping sections 33 attached thereto are located over the grooves 39 and flat regions 22 between vent plugs 21 and, if there are rings 26 around the tops 24 of the vent plugs 21, over such rings.

The shelf portion 12 of the top member 11 serves to reinforce more flexible materials such as polyethylene. The central portion 14 and lower region 32 of the top member 11 are located over the vicinity of the vent plugs 21 in order to provide a more effective baffle for the drops of electrolyte which might splash up from the hole 27 in the base 28 of the vent plug 21. Generally, baffling of the electrolyte does not require more than merely a top member 11 having a flat surface 38 close to the bottom member 18.

The vent tube 29 can be located at any point on the vent. In addition, a vent can have a plurality of vent tubes located at different points on the vent. This feature would allow several gang-type vents to be connected in series in a suitable application, for example, a 12-volt battery.

The gang-type vent of this invention is blow molded by the method of first extruding either a tubular parison or a pair of film sheets of heated thermoplastic resin and clamping the parison or film sheets while still pliable between mating die members having cooperating mold cavities configured to the external shape of the hollow gang-type vent to be formed. Alternately a pair of pliable preheated, preformed film sheets of thermoplastic resin are clamped between the mating die members. Whether extruded or preformed, the film sheets fuse when clamped.

The die members are partable along a parting line. The parting line proceeds either in a single flat plane or in a stepwise fashion around the periphery of the hollow vent to be formed, in the area between the top 11 and bottom 18 members of the gang-type vent to be formed.

Second, a blow molding duct is introduced into the die members and into the parison or between the film sheets to provide communication internally of the plastic parison or film sheets at a point on the surface of the hollow gang-type vent to be formed. Gas under pressure is introduced through the duct while the parison or pair of film sheets is clamped between the closed die members in order to force the wall of the parison or of the fused pair of film sheets outwardly into contact with the surfaces of said mold cavities until the plastic has cooled sufficiently to rigidify. Finally, the die members are parted, and the molded hollow gang-type vent is removed from the die cavities. The hole 27 in the base 28 of each vent plug 21 is produced in the blow molded vent by a subsequent secondary operation.

Conventional blow molding equipment is used in this process. The operating conditions depend on the particular thermoplastic material used.

What is claimed is:

1. A dimensionally flexible leak-proof, joint-free, blow-molded one-piece thermoplastic resinous hollow gang-type vent with vent plugs for a plurality of the filling wells of a multiple-cell battery comprising:
   a. a top member;
   b. a skirt integrally molded with said top member and peripherally and integrally attached at its upper end to said top member and extending downward from said top member;
   c. a bottom member integrally molded with said top member and said skirt and peripherally and integrally attached to said skirt at its lower end, said bottom member comrises:
      1. vent plugs of a number and location corresponding to the number and location of a plurality of the filling wells of the multiple-cell battery and of suitable dimensions to fit snugly into said filling wells, to thereby form a fluid-tight fit in the absence of an external means for securing said plugs in said filling wells, each vent plug having a hole in its base to permit passage of gases and electrolyte through the vent plug;
      2. a flat region extending from the periphery of said bottom member toward the tops of the vent plugs and integrally attached to the periphery of said bottom member; and
      3. a ring around the top of each vent plug connecting said flat region to the top of each said vent plug and integrally attached to both, said ring distributing stresses and permitting dimensional flexibility in said vent to compensate for structural variations in said vent or said battery; and
   d. a first tube integrally molded with said top member, skirt, and bottom member and extending outwardly from said skirt to vent gases and electrolyte escaping from said battery to a point removed from the location of said battery,
wherein the combination of said top member, skirt, bottom member, and first tube is a leak-proof, joint-free, integral, unitary, hollow, structure made up of a sole part.

2. The vent of claim 1 wherein the top member is a flat surface.

3. The vent of claim 1 wherein the top member comprises a shelf portion integrally attached through a downward sloping section to a downwardly offset central portion, forming a central depression located over the vicinity of the vent plugs.

4. The vent of claim 1 wherein the top member comprises a shelf portion integrally attached through a downwardly sloping section to a central portion, said central portion comprising alternating higher and lower regions integrally attached to one another through sloping sections, said lower regions being located over the vent plugs in the region within the walls of the vent plugs.

5. The vent of claim 1 comprising additionally a second vent tube integrally molded with said top member, skirt, bottom member and first tube and extending outwardly from a different point on said skirt than said first vent tube.

6. The vent of claim 1 wherein the flat region between each pair of vent plugs has a groove, said groove extending from a point on the skirt to another point on the skirt and separating the segment of the flat horizontal region surrounding one vent plug from the segment of the flat horizontal region surrounding the other vent plug.

7. The vent of claim 6 wherein the top member is a flat surface.

8. The vent of claim 6 wherein the top member comprises a shelf portion integrally attached through a downward sloping section to a downwardly offset central portion, forming a central depression located over the vicinity of the vent plugs.

9. The vent of claim 6 wherein the top member comprises a shelf portion integrally attached through a downwardly sloping section to a central portion, said central portion comprising alternating higher and lower regions integrally attached to one another through sloping sections, said lower regions being located over the vent plugs in the region within the walls of the vent plugs.

* * * * *